United States Patent
Kalika et al.

(10) Patent No.: US 8,559,410 B2
(45) Date of Patent: Oct. 15, 2013

(54) SELF-CONFIGURING, SELF-OPTIMIZING WIRELESS LOCAL AREA NETWORK SYSTEM

(75) Inventors: Leonid Kalika, Santa Monica, CA (US); Alexander Berg, Tarzana, CA (US); Gabi Abraham, Oak Park, CA (US); Cyrus Irani, Palos Verdes Estates, CA (US)

(73) Assignee: Strix Systems, Inc., Westlake Village, CA (US)

( * ) Notice: Subject to any disclaimer, the term of this patent is extended or adjusted under 35 U.S.C. 154(b) by 27 days.

(21) Appl. No.: 13/245,254

(22) Filed: Sep. 26, 2011

(65) Prior Publication Data

US 2012/0014285 A1    Jan. 19, 2012

Related U.S. Application Data

(63) Continuation of application No. 12/775,175, filed on May 6, 2010, now Pat. No. 8,027,324, which is a continuation of application No. 10/549,342, filed as application No. PCT/US2004/009237 on Mar. 24, 2004, now Pat. No. 7,733,833.

(60) Provisional application No. 60/457,529, filed on Mar. 24, 2003.

(51) Int. Cl.
*H04Q 7/24* (2006.01)

(52) U.S. Cl.
USPC .......................................... 370/338; 370/469

(58) Field of Classification Search
USPC .................... 370/328, 338, 401, 465, 469
See application file for complete search history.

(56) References Cited

U.S. PATENT DOCUMENTS

| | | | |
|---|---|---|---|
| 5,596,719 A | 1/1997 | Ramakrishnan et al. | |
| 5,812,531 A | 9/1998 | Cheung et al. | |
| 5,987,011 A | 11/1999 | Toh | |
| 6,046,992 A * | 4/2000 | Meier et al. | 370/338 |
| 6,252,884 B1 | 6/2001 | Hunter | |
| 6,499,006 B1 | 12/2002 | Rappaport et al. | |

(Continued)

FOREIGN PATENT DOCUMENTS

EP    0631413 B1    12/1994

OTHER PUBLICATIONS

International Search Report dated Oct. 22, 2004 for PCT/US04/09237.
Written Opinion dated Oct. 22, 2004 for PCT/US04/09237.

(Continued)

*Primary Examiner* — Ricky Ngo
*Assistant Examiner* — Christine Ng
(74) *Attorney, Agent, or Firm* — Foley & Lardner LLP; Christopher J. McKenna

(57) ABSTRACT

A system and associated method provides for a wireless local area network (WLAN) that permits mobile units to communicate with an external, wired network. Nodes in the WLAN include multiple components, such as a base module, antenna module, and one or more wireless modules. Indeed, this system can employ two or more wireless modules that employ different short-range wireless protocols, such as IEEE 802.11-type and Bluetooth protocols. The nodes may perform self-discovery to determine modules within the node and associated functionality, as well as identify neighboring nodes to thereby establish a mesh-type network. Nodes can be configured to provide connectivity to the wired network, while others (access points) communicate wirelessly with mobile devices. The nodes may then be interconnected wirelessly, or via wires.

9 Claims, 6 Drawing Sheets

WIRELESS LOCAL AREA NETWORK SYSTEM

(56) References Cited

U.S. PATENT DOCUMENTS

| | | | |
|---|---|---|---|
| 6,594,493 B1* | 7/2003 | Davies et al. | 455/436 |
| 6,691,293 B2 | 2/2004 | Kanazawa | |
| 6,697,325 B1 | 2/2004 | Cain | |
| 6,704,301 B2 | 3/2004 | Chari et al. | |
| 6,760,748 B1 | 7/2004 | Hakim | |
| 6,971,063 B1 | 11/2005 | Rappaport et al. | |
| 7,009,966 B2 | 3/2006 | Borchering | |
| 7,013,162 B2* | 3/2006 | Gorsuch | 455/553.1 |
| 7,016,362 B2* | 3/2006 | Mehravari | 370/401 |
| 7,085,541 B2 | 8/2006 | Redi et al. | |
| 7,103,313 B2 | 9/2006 | Heinonen et al. | |
| 7,106,816 B2 | 9/2006 | Filipovic | |
| 7,107,577 B2* | 9/2006 | de Boer et al. | 717/121 |
| 7,272,121 B2* | 9/2007 | Wilkes et al. | 370/331 |
| 7,350,077 B2* | 3/2008 | Meier et al. | 713/171 |
| 7,382,749 B2* | 6/2008 | Yam | 370/331 |
| 7,561,549 B2* | 7/2009 | Meier et al. | 370/331 |
| 2002/0037719 A1 | 3/2002 | Ariga et al. | |
| 2002/0039353 A1 | 4/2002 | Bienn et al. | |
| 2002/0067693 A1 | 6/2002 | Kodialam et al. | |
| 2002/0191573 A1 | 12/2002 | Whitehill et al. | |
| 2003/0123457 A1 | 7/2003 | Koppol | |
| 2003/0172142 A1 | 9/2003 | Su | |
| 2003/0202512 A1 | 10/2003 | Kennedy | |
| 2004/0028023 A1* | 2/2004 | Mandhyan et al. | 370/351 |
| 2004/0100923 A1 | 5/2004 | Yam | |
| 2004/0143428 A1 | 7/2004 | Rappaport et al. | |
| 2007/0117567 A1 | 5/2007 | Rappaport et al. | |

OTHER PUBLICATIONS

International Search Report and Written Opinion; International Patent Application PCT/US04/09074, filed Mar. 24, 2004 (WO 2004/086783); Applicant—Strix Stystems, Inc., mailed Aug. 3, 2004; 4 pps.

US Notice of Allowance on U.S. Appl. No. 12/880,280 dated Mar. 2, 2012.

US Office Action for U.S. Appl. No. 13/435,876 dated Jan. 24, 2013.

US Office Action for U.S. Appl. No. 13/435,876 dated Mar. 27, 2013.

US Office Action for U.S. Appl. No. 13/435,876 dated Jul. 5, 2012.

* cited by examiner

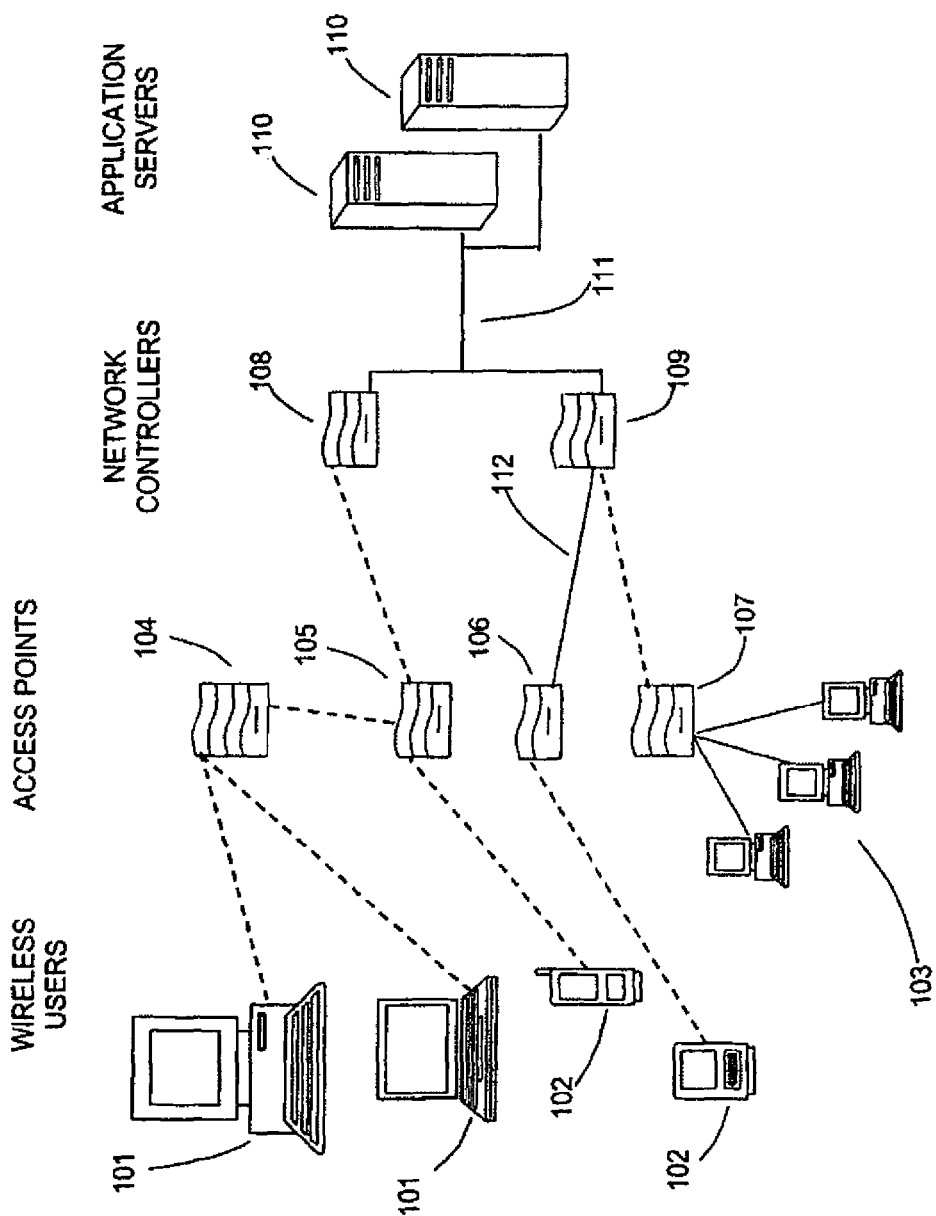
FIG. 1A  WIRELESS LOCAL AREA NETWORK SYSTEM

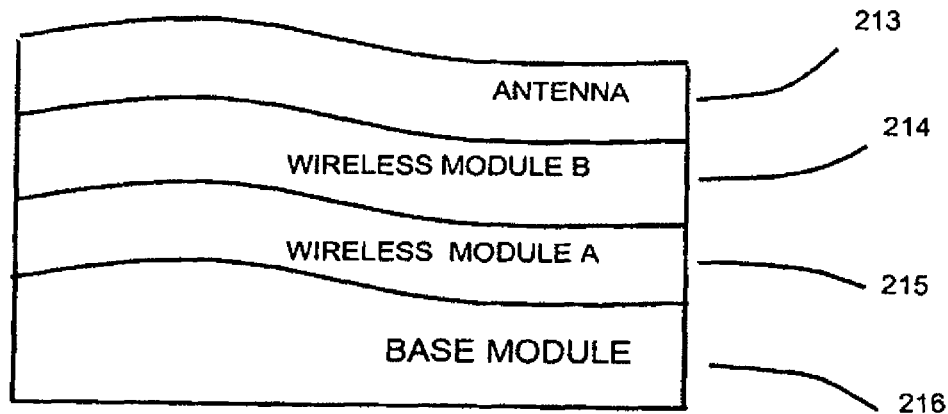
FIG. 2  TYPICAL MODULE STACK
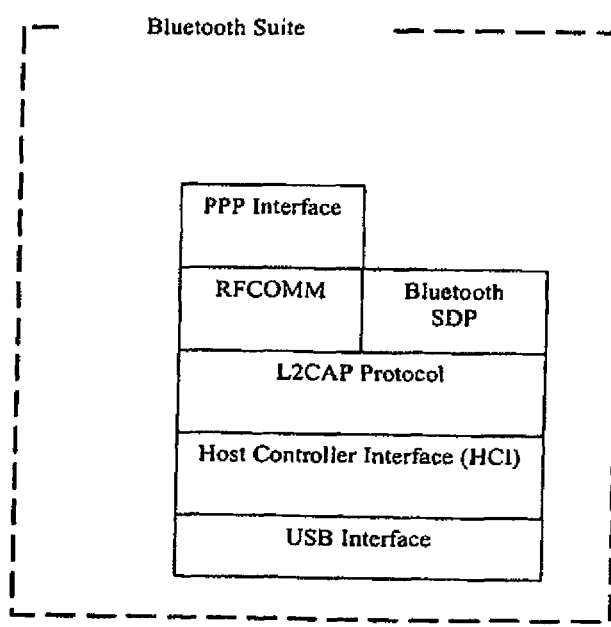
FIG. 4  BLUETOOTH SUITE

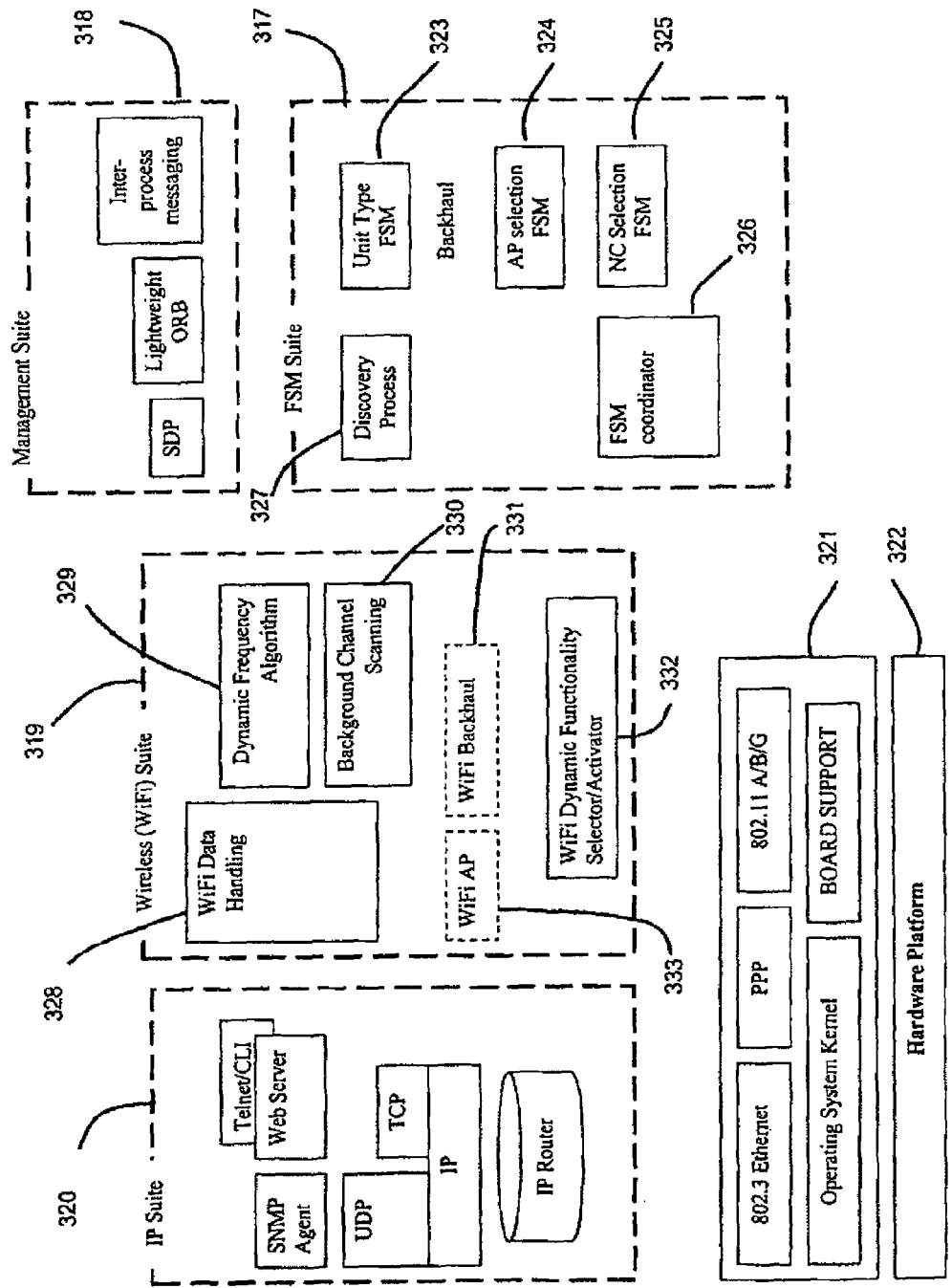
FIG. 3   NODE SOFTWARE BLOCK DIAGRAM

| STATES<br>EVENTS | 0<br>SELF_DISC | 1<br>STACK_DISC | 2<br>PENDING | 3<br>AP | 4<br>BH | 5<br>BH_FINAL |
|---|---|---|---|---|---|---|
| radioInfo | Init, rsi, next | - | - | - | - | - |
| Force BH Timer timeout | - | - | 4 | - | - | - |
| next | 1 | 2 | - | - | - | - |
| intraStackRprt | - | intra stack logic, start Force BH Timer | - | - | - | - |
| DHCP(b) Rprt | sdf, 2 | sdf, 2 | sdf, pndLogic | - | sdf, 5 | - |
| DHCP(e) Rprt | sdf, 2 | sdf, 2 | sdf, pndLogic | - | sdf, 3 | - |
| apQualified | 3 | 3 | 3 | - | - | - |
| bhQualified | 5 | 4 | 4 | - | - | - |
| Pending | - | 2 | - | - | - | - |

*FIG. 5*  UNIT TYPE FINITE STATE MACHINE

| Iam802.11 | only radio | IamBottomRadio | IamTopRadio | 11A_aboveMe | Iam11b | Result |
|---|---|---|---|---|---|---|
| FALSE | X | X | X | X | X | AP/B |
| TRUE | FALSE | TRUE | FALSE | FALSE | FALSE | PENDING |
| TRUE | FALSE | TRUE | FALSE | FALSE | TRUE | PENDING |
| TRUE | FALSE | TRUE | FALSE | TRUE | FALSE | PENDING |
| TRUE | FALSE | TRUE | FALSE | TRUE | TRUE | AP |
| TRUE | FALSE | X | TRUE | X | X | AP |
| TRUE | FALSE | FALSE | FALSE | X | X | AP |
| TRUE | TRUE | X | X | X | X | PENDING |

*FIG. 6*  MODULE INTRA-STACK LOGIC

| DHCP enabled | gateWay/server Found | Force BH Timer timeout | Result |
|---|---|---|---|
| FALSE | FALSE | FALSE | BH |
| FALSE | FALSE | TRUE | TRY_AGAIN |
| FALSE | TRUE | X | AP |
| TRUE | FALSE | X | BH |
| TRUE | TRUE | X | AP |

*FIG. 7*  PENDING LOGIC TABLE

| STATES EVENTS | 0<br>Down<br>Init | 1<br>AP_DETECTED<br>i_C_cntr,C=N | 2<br>AP_SELECTED<br>_stopST |
|---|---|---|---|
| PosInfo | setStkName | - | - |
| Rcv_rport | Next, rcv_logic | rcv_logic | rcv_logic |
| rcv_SEL_AP | - | i_C_cntr = 0 | - |
| rcv_NEW_AP | - | C_cntr = 1,<br>C = N<br>1 | 1 |
| rcv_CAN_AP | - | i_C_cntr, if<br>(i_C_cntr == max )<br>then Next | - |
| Next | 1 | S=C,2 | - |
| link_lost | - | 0 | 0 |
| force_sel | - | Next | - |

FIG. 8  ACCESS POINT SELECTION FINITE STATE MACHINE

| | Max Index | 0 | 1 | 2 | 3 | 4 | 5 | 6 | 7 | 8 | 9 | 10 | 11 |
|---|---|---|---|---|---|---|---|---|---|---|---|---|---|
| 11a | 8 | 6 | 9 | 12 | 18 | 24 | 36 | 48 | 54 | 0 | 0 | 0 | 0 |
| 11a turbo | 8 | 12 | 18 | 24 | 36 | 48 | 72 | 96 | 108 | 0 | 0 | 0 | 0 |
| 11b | 4 | 1 | 2 | 5 | 11 | 0 | 0 | 0 | 0 | 0 | 0 | 0 | 0 |
| 11g | 12 | 1 | 2 | 5 | 6 | 9 | 11 | 12 | 18 | 24 | 36 | 48 | 54 |

FIG. 9  LINK BIT RATE ESTIMATED FROM RECEIVED SIGNAL STRENGTH INDICATOR

SELF-CONFIGURING, SELF-OPTIMIZING WIRELESS LOCAL AREA NETWORK SYSTEM

CROSS-REFERENCE TO RELATED APPLICATION(S)

This application is a continuation of U.S. patent application Ser. No. 12/775,175 filed May 6, 2010 and entitled SELF-CONFIGURING, SELF-OPTIMIZING WIRELESS LOCAL AREA NETWORK SYSTEM, which in turn is a continuation of U.S. patent application Ser. No. 10/549,342 filed Feb. 5, 2007, now U.S. Pat. No. 7,733,833, which in turn is a U.S. national stage entry under 35 U.S.C. 371 of International Application No. PCT/US04/09237 filed Mar. 24, 2004, which in turn claims the benefit of U.S. Provisional Patent Application No. 60/457,529, filed Mar. 24, 2003, each of which is incorporated by reference herein in its entirety for all purposes.

BACKGROUND

Wireless telecommunications networks employ nodes or access points within a geographic area or space to provide wireless coverage for users. An access point (AP) is typically a physical edge device that allows wireless user devices to access network resources, and is sometimes referred to as a node. Wireless local area networks (WLAN) typically employ existing protocols such as those under IEEE 802.11, which is a specification that defines WLAN data link and physical layers. The 802.11 specification includes a media access control (MAC) sublayer within the data link layer, and two sublayers of the physical layer (PHY)-orthogonal frequency division multiplexing (OFDM) and a direct-sequence spread-spectrum (DSSS) modulation scheme. The Bluetooth specification (IEEE 802.15) uses a frequency-hopping spread spectrum (FHSS) modulation scheme.

The FHSS technique modulates a data signal with a narrow band carrier signal that "hops" in a predictable sequence from frequency to frequency as a function of time over a wide band of frequencies. Interference is reduced because a narrow band interferer affects the spread-spectrum signal only if both are transmitting at the same frequency and at the same time. The transmission frequencies are determined by a spreading (hopping) code. The receiver must be set to the same hopping code and must listen at the incoming signal at the proper time and frequency to receive the signal. OFDM splits a wide frequency band into a number of narrow frequency bands and sends data across the sub-channels. DSSS combines a data signal at the sending station with a higher data rate bit sequence, which often is referred to as a "chip sequence." A high processing gain increases the signal's resistance to interference.

Various IEEE 802.11 protocols exist, including 802.11a, 802.11b, 802.11g, 802.11e, 802.11i and others. These and other protocols are often referred to as "WiFi," which is short for wireless fidelity. Other short-range wireless protocols include Hiperlan, which has been adopted by the European Telecommunications Standards Institute (ETSI). Other short range wireless protocols and technologies include Bluetooth (IEEE 802.15.1), ultrasonic, infrared, etc. Overall, creating and implementing networks of short range wireless embodies many difficulties.

BRIEF DESCRIPTION OF THE DRAWINGS

FIG. 1A is a diagram of a wireless local area network or WLAN showing one physical configuration of an embodiment of the invention that provides wireless services to various users and a connection with a conventional wired network.

FIG. 2. is a schematic diagram illustrating an example of a "node," a number of which can be used to build a wireless network such as that of FIG. 1A.

FIG. 3 is a block diagram of software present in each node of the WLAN of FIG. 1.

FIG. 4 is a block diagram of software pertaining to "Bluetooth" wireless functions.

FIG. 5 is a state table that describes finite state machine logic applied by the software in each processor-equipped module of a node to determine its own characteristics ("self discovery") and its role in the WLAN (whether it acts as an "access point" or as a "backhaul" module).

FIG. 6 is a logic table showing an intra-stack self-discovery process.

FIG. 7 is a logic table for a PENDING state under FIG. 6.

FIG. 8 is a state table that describes finite state machine logic followed by software in processor-equipped modules, which have determined their roles to be that of a "backhaul" module.

FIG. 9 is an example of a lookup table that can be used in a calculation of a best combination of round trip delay and signal strength.

Figure 1B:
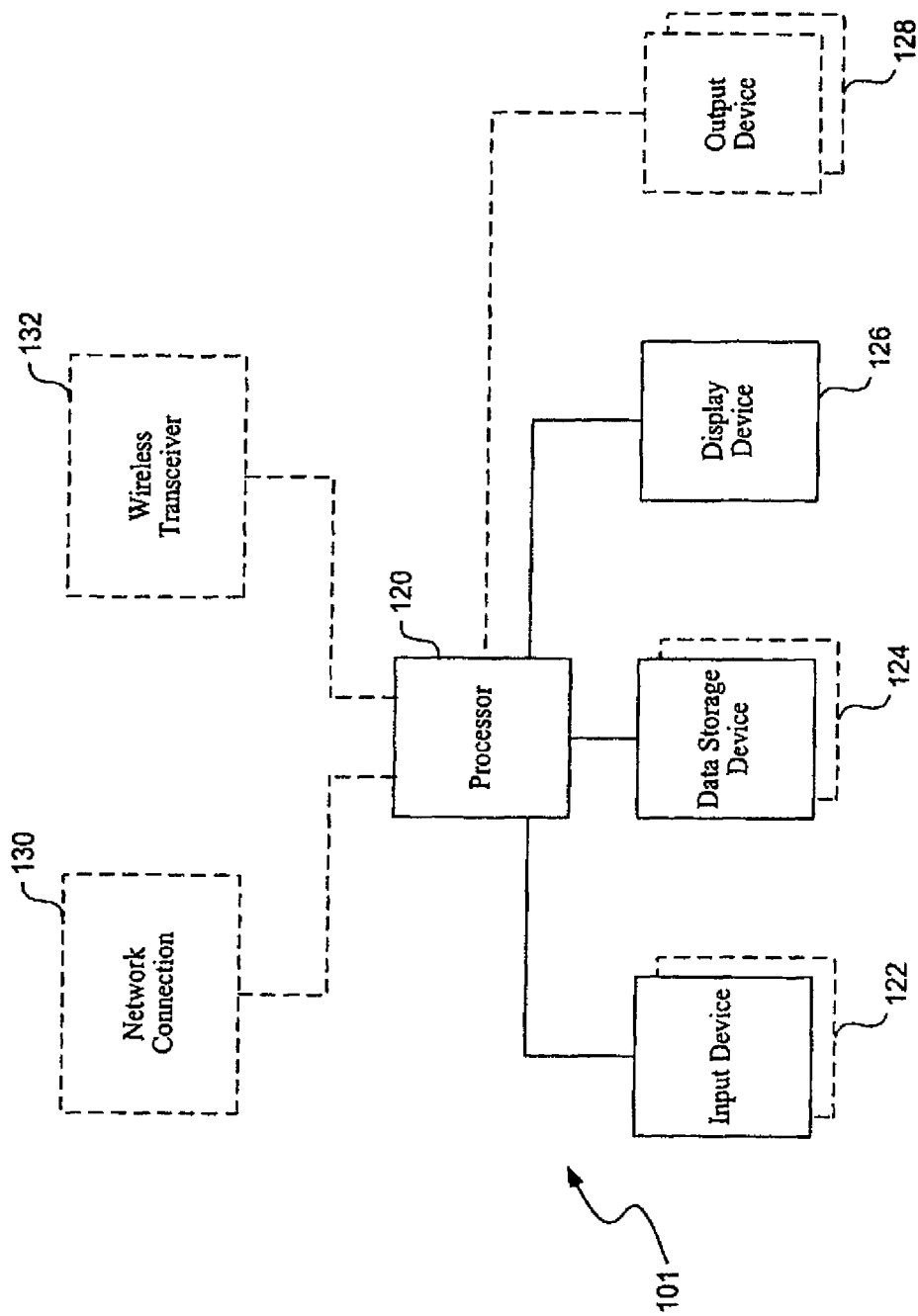
FIG. 1B is a block diagram of a suitable computer for employing aspects of the invention.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the FIG. number in which that element is first introduced (e.g., element 204 is first introduced and discussed with respect to FIG. 2).

DETAILED DESCRIPTION

A wireless local area network system described below solves problems of providing wireless connectivity for a large number of users at low costs for installation and management, with multiple radio-frequency technologies, and high levels of performance, security, robustness and flexibility. It employs a network of "nodes" each of which contains an appropriate set of functional modules to provide at that node the required connectivity services (which can be wired or wireless) and a processor or processors to run the controlling software. The software ensures that nodes are intelligent, self-contained, and act to discover their neighbors. Acting together by means of their distributed intelligence the nodes establish a network of connections that carry data traffic. The software adopts a "mesh" topology for the connections and ensures that routing is optimized, automatically, upon initiation and at frequent intervals thereafter. Thus the system can adjust itself automatically when nodes are added, removed or fail, and the software contains mechanisms that preserve security even in these cases. Other details and aspects are described below.

In a broad sense, aspects of the invention include a system and associated method provides for a wireless local area network (WLAN) that permits mobile units to communicate with an external, wired network. Nodes in the WLAN include multiple components, such as a base module, antenna module, and one or more wireless modules. Indeed, this system can employ two or more wireless modules that employ different short-range wireless protocols, such as IEEE 802.11-type and Bluetooth protocols. The nodes may perform self-discovery to determine modules within the node and associated functionality, as well as identify neighboring nodes to thereby establish a mesh-type network. Nodes can be configured to provide connectivity to the wired network, while others (access points) communicate wirelessly with mobile devices. The nodes may then be interconnected wirelessly, or via wires.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

FIG. 1A shows an example configuration of a wireless local area network (WLAN) system that embodies aspects of the invention. Many different configurations are possible using the same methods and principles described here. Wireless users may be making use of various types of personal computers 101 equipped with wireless connectivity or portable wireless digital devices 102. Another class of user that the system is intended to accommodate is made up of small groups of users who have personal computers with wired ethernet connectivity. Such a group is called a workgroup and an example is shown at 103. Numbers of each of various types of network nodes such as those shown at 104, 105, 106, 107, 108 and 109 form a wireless network. Each node is an assembly of modules containing the electronics and software that implement the functions described below.

The wireless network is intended to connect with a conventional main or backbone wired network system illustrated here by the application servers 110 and their wired ethernet connections 111. The personal computers 101 and portable devices 102 connect wirelessly into the network through nodes serving as access points 104, 105 and 106 by means of standard digital wireless technology, of which there are several types in general use, and as described below. The access point used by a particular personal computer or device will ordinarily be the closest one that supports the wireless technology used by the personal computer or wireless device. Workgroup computers such as those shown at 103 are connected to their access point nodes such as 107 by means of ethernet cables.

A connection by a user or client to a node such as 101, 102 or 103 is known as an Access Point (AP) connection. Access Point nodes also connect back to the main backbone wired network system. If the connection back to the main backbone wired network system is wireless it is known as a "Backhaul" (BH) connection. Some access point nodes in a system, such as that shown here as 104, may connect back to the main backbone wired network system via another access point node acting as a relay such as that shown here at 105. Other access point nodes, such as those shown here at 105 and 107 connect back wirelessly via nodes acting as Network Controllers (NC), shown here at 108 and 109. Yet other access point nodes, such as 106, may connect back through an ethernet wire, 112, via a network controller node such as 109.

Networks may contain more or fewer nodes than are shown in this example and many other combinations of wired and wireless data communication functions in particular nodes are possible. Every such network will contain at least one access point for wireless user connection, at least one main network connection by wired ethernet, and at least one network controller for management subsystem services.

Unless described otherwise herein, the blocks and elements depicted in FIG. 1A and the other FIG.s are well known or described in detail in the above cross-referenced provisional patent application. Indeed, much of the detailed description provided herein is explicitly disclosed in the above provisional patent application; much of the additional material of aspects of the invention will be recognized by those skilled in the relevant art as being inherent in the detailed description provided in such provisional patent application, or well known to those skilled in the relevant art. Those skilled in the relevant art can implement aspects of the invention based on the FIG.s and the detailed description provided in the provisional patent application.

FIG. 1B and the following discussion provide a brief, general description of a suitable environment in which aspects of the invention can be implemented. Although not required, aspects of the invention are described below in the general context of computer-executable instructions, such as routines executed by a general-purpose computer, e.g., a server computer, wireless device or personal computer. Those skilled in the relevant art will appreciate that the invention can be practiced with other communications, data processing or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers and the like. Indeed, the terms "computer", "host" and "host computer" are generally used interchangeably, and refer to any of the above devices and systems, as well as any data processor.

Aspects of the invention can be embodied in a special purpose computer or data processor that is specifically programmed, configured or constructed to perform one or more of the computer-executable instructions explained in detail herein. As described below, aspects of the invention can be practiced in distributed computing environments where tasks or modules are performed by remote processing devices, which are linked through a communications network, such as a Local Area Network ("LAN"), Wide Area Network ("WAN") or the Internet. In a distributed computing environment, program modules may be located in both local and remote memory storage devices.

Aspects of the invention may be stored or distributed on computer-readable media, including magnetically or optically readable computer discs, hard-wired or preprogrammed in chips (e.g., EEPROM semiconductor chips), nanotechnology memory, biological memory, or other data storage medium. Indeed, computer implemented instructions, data structures, screen displays, and other data under aspects of the invention may be distributed over the Internet or over other networks (including wireless networks), on a propagated signal on a propagation medium (e.g., an electromagnetic wave (s), a sound wave, etc.) over a period of time, or may be provided on any analog or digital network (packet switched, circuit switched or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

Referring to FIG. 1B, one aspect of the invention may be performed on a computer, such as the personal computer 101, or other computer, which typically employs one or more processors 120 coupled to one or more user input devices 122 and data storage devices 124. The computer is also coupled to at least one output device such as a display device 126 and one or more optional additional output devices 128 (e.g., printer, plotter, speakers, tactile or olfactory output devices, etc.). The computer may be coupled to external computers, such as via a network connection 130, a wireless transceiver 132, or both.

The input devices 122 may include a keyboard and/or a pointing device such as a mouse. Other input devices are possible such as a microphone, joystick, pen, game pad, scanner, digital camera, video camera, and the like. The data storage devices 124 may include any type of computer-readable media that can store data accessible by the computer 101, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet (not shown in FIG. 1B).

FIG. 2 illustrates an example implementation of a node such as that shown at 104 in FIG. 1. In a typical embodiment each node is an assembly, or "stack" of modules each of which contains the hardware and software required to implement its designated function.

In its role as a network access point the node 104 may be required to communicate user data by means of two different standard wireless technologies and to perform some network system functions. Therefore this access point example of a node is shown as a stack of functional modules including 1) a Wireless Module B 214, which has the radio-frequency components and other electronics to implement a standard wireless data communication technology such as that described in IEEE specification 802.11b; 2) an embedded computer including processor and memory; and 3) logic to connect with the modules above and below it. Another module in the stack, shown as Wireless Module A 215, has the radio frequency components and other electronics to implement another wireless data communication technology such as that described in IEEE specification 802.11a, but it is otherwise identical with 214. The two modules 214 and 215 share an antenna module 213, and their embedded computers each execute the software described herein in order to perform the network system functions and wireless communications via the antenna module. A base module 216 supplies power to the upper stack modules 213, 214 and 215.

Thus each of the nodes in the wireless network local area network system contains the electronics components necessary to implement the data communications functions required of it and at least one embedded computer or processor to execute the software, the same software being used in every node. These characteristics of the physical implementation of the nodes can be met by many variations on the example given here, using well-known methods.

With reference to FIG. 3, which is a diagram of the software used by each processor in each node (subject to the exception noted below with reference to FIG. 4), the software executes on a processor hardware platform 322, which is of a well-known type. The software is loaded into the node processor hardware platforms from the main wired network by well-known means. The software is organized into groups shown in FIG. 3. Software Group 321 is of well-known type including an operating system kernel, board support required by the particular hardware platform, 322, software for Ethernet connections according to IEEE standard 802.3, for the wireless protocols specified in IEEE standards 802.11a, 802.11b, 802.11g, and for point-to-point protocols generally used in network systems. IP Suite or Group 320 is a set of software of well-known type for Internet protocols, including Internet protocol routing, Transmission Control Protocol, Internet Protocol, User Data Protocol, a Simple Network Management Protocol agent, a web server, Telnet virtual terminal protocol and a Command Line Interface. Management Suite 318 contains software of well-known type including a Simple Discovery Protocol to support the logic of node discovery described elsewhere, an Object Request Broker, of a class known as lightweight because of its compactness and basic functionality, for certain standard network services, and inter-process messaging for linking software processes for each particular type of hardware platform.

A Finite State Machine (FSM) Suite 317 contains several software components or blocks whose functions are described below. A FSM coordinator 326 is a main state machine that oversees other components in the Suite 317. A Discovery Process 327 implements intra-stack discovery logic described in detail later. A Unit Type FSM 323 includes logic followed by each node stack to determine roles of the modules that contain processors, as also described in detail later. An AP selection FSM 324 is a process by which a backhaul module determines to which access points it connects wirelessly with the shortest round trip delay, as described later, operating at startup and constantly thereafter in background seeking the best set of nearby APs. A Network Controller (NC) selection FSM 325 includes logic through which an AP selects the NC through which it will connect with the main wired network system, described later.

A Wireless (WiFi) Suite 319 contains software that implements several wireless communications functions. A WiFi Data Handling program 328 of well-known type handles encapsulation and de-encapsulation of the wireless data frames and the interface to the data path of the operating system. Dynamic Frequency Algorithm software 329 of well-known type scans all available wireless channels for possible connections to APs and builds and maintains a record of Received Signal Strength Indicator (RSSI) values which each AP uses to select an operating channel that has the least co-channel interference, thus helping to maximize network performance. A Background Channel Scanning software routine 330 builds and periodically updates a list of nearby APs with their associated RSSI and Round Trip Delay (RTD) values, which is used by the AP Selection FSM 324 to seek and maintain the best set of APs. A WiFi Backhaul (BH) software task 331 of well-known type manages routine aspects of the Backhaul connections including their association and monitoring. A WiFi Dynamic Functionality Selector/Activator software block 332 of well-known type is responsible for carrying out the Unit Type FSM 323 decisions, described later, by initializing the respective Backhaul and AP modules according to the decisions. A WiFi AP software block 333 of well-known type measures and reports the Round Trip Delay (RTD) values.

With reference to FIG. 4, a module which supports wireless communication according to IEEE specification 802.15.1, known as a Bluetooth module, requires in addition to the software shown in FIG. 3, a suite as shown in FIG. 4 which is of well-known type. For convenience it may be loaded into every processor-equipped module, but it is used only by each Bluetooth module. The Bluetooth suite shown in FIG. 4 consists of a Point-to-Point Protocol, Radio Frequency Communication software, a Bluetooth Simple Discovery Protocol, a Logical Link Control and Adaptation Protocol, a Host Control Interface, and a Universal Serial Bus Interface. The Bluetooth module also uses components shown in FIG. 3, namely the hardware platform 322, software Group 321, IP Suite 320 and Management Suite 318. The Bluetooth module does not use the Wireless (WiFi) Suite 319 nor FSM Suite 317 as shown in FIG. 3.

By means of the software described here a wireless mesh is automatically established and maintained even as nodes are added, removed or fail. The mesh is "partial" because not all possible connections between nodes are selected for use, only the minimum necessary to enable the data traffic to be routed between all users and the external main backbone wired network. Control is distributed by means of processing and software present in each node, which operates independently according to programmed rules to discover itself and other nodes and to select connections, thereby becoming integrated into an effective network. Furthermore, selected connections are those that the nodes themselves determine consistently to have the best combination of round-trip delay (RTD) and signal strength, namely the combination that achieves the highest data communication rate, as described below. Thus routing is optimum in the sense that the system automatically seeks and uses the fewest, best routes. Because the routing process operates continuously and takes only a few seconds or less to execute, the system quickly restores optimum routing in response to changes such as adding or removing nodes, or node failure.

Node/Module Initialization & Maintenance

When a new node and its associated stack of units or modules is powered up, each processor-equipped wireless module goes through intra-stack discovery (self-discovery), which determines its type and role or mode within the node, which may be as an Access Point or, except in the case of a Bluetooth module, a Backhaul, which is an infrastructure role. This is followed by AP Selection, after which the node will wait for (Dynamic Host Configuration Protocol) DHCP inquiry to complete. DHCP is a method for dynamically assigning IP addresses to devices on a network, whereby IP addresses are automatically issued within a specified range to devices such as PCs when they are first powered up. The device retains the use of the IP address for a specific license period defined by a system administrator.

The following rules are applied to determine if any of the modules on the stack will be a backhaul (BH) and if so which module on the stack will be the backhaul. In order for a wireless module, such as module 214 or 215, to determine its role in a stack, the wireless module uses the following three criteria:
 (1) Position on the stack,
 (2) Knowledge of other modules in the stack, and
 (3) How the DHCP was obtained—wirelessly or via wired Ethernet Based on the DHCP source (wireless backhaul or wired Ethernet) and the functions of other stack modules, a role change from backhaul to access point might take place at this point. Provision by well-known means is made in the software so that if the DHCP source changes at any later time between wireless backhaul and wired Ethernet, the module role will change between backhaul and access point using the same criteria. Such a change may occur, for example, if an Ethernet cable is connected to or disconnected from a node. It should be noted that a module that is to function as a Network Controller (NC) is most conveniently directed to do so by means of an indication in hardware by well-known means such as code in a read-only memory.

FIG. 5 is a table of a type known as a State Transition Table. The column headings correspond with states of the unit type FSM 323 and the row headings correspond with system events input to the FSM. The entry at each intersection of a column and a row shows the result of the input event named in the row heading on the state named in the column heading. The result may be a particular action or actions, transition to another state, or both, or no effect, as specified for the particular intersection.

FIG. 6 is of a type known as a Truth Table. It shows the logic variables evaluated in the self-discovery tests by a module capable of wireless data communication, namely: whether it supports IEEE specification 802.11 (iam802.11), whether it is the only such module in the stack (only radio), whether it is the bottom (iamBottomRadio) or top (iamTopRadio) such module in the stack respectively, whether a module supporting wireless communication according to IEEE specification 802.11a is above it (11A_aboveMe), and whether it supports communication according to IEEE specification 802.11b (iam11b). The Results column shows the outcomes for the possible combinations of TRUE and FALSE values of the variables. An X in FIG. 6 indicates that the value of the particular cell has no effect on the outcome. "AP" in the Results column means that the module will operate as an Access Point supporting wireless communication according to IEEE specification 802.11. "AP/B" means that it will operate as an access point according to IEEE specification 802.15.1, known as "Bluetooth" technology. "PENDING" means that a decision on whether the module will operate as an access point or backhaul must be made according to the logic in FIG. 7.

FIG. 7 is also of a type known as a Truth Table. It shows logic variables evaluated by tests for whether DHCP was enabled in the configuration of the module (DHCP enabled) and whether a connection was found to a main or backbone network (gateWay/server Found). A prescribed time is allowed for the test, which determines the value of gateWay/server Found. If the prescribed time has been exceeded, the variable Force BH Timer timeout is TRUE, otherwise Force BH Timer timeout is FALSE. The Results column shows the outcomes for the possible combinations of TRUE and FALSE values of the variables. An X indicates that the value of the particular table entry or cell has no effect on the outcome. "BH" in the Results column means that the module will operate as a Backhaul. "AP" means that it will operate as an Access Point. "TRY_AGAIN" means that the test for whether a connection was found to a main or backbone network (gateWay/server Found) must be repeated. Well-known means, such as a decrementing counter, limit the repetitions of the test to a suitable number. When the limit has been reached the software assigns the module to operate as a Backhaul.

Examples of possible paths through the FSM states in FIG. 5 follow. Further, the entries in FIG. 5 can be understood from the following key (where numbers in the columns indicate next states).
 radioInfo: a report containing the unit radio (or wireless) type and the allowed operation modes as saved in the board configuration (physical hardware);
 Force BH Timer: a safety timer applied to DHCP response from the backbone;
 next: internal event generated by the FSM to simplify the implementation;

intraStackRprt: a report containing the stack topology discovered by the unit (what other modules are in a given stack);

DHCP(b) Rprt: indicates that DHCP has been established via a wireless port;

DHCP(e) Rprt: indicates that DHCP has been established via an Ethernet port;

apQualified: internal event (result of Stack Logic FIG. 6) that indicates the ability of the unit to operate as an AP;

bhQualified: internal event (result of Stack Logic FIG. 6) that indicates the ability of the unit to operate as a BH;

Pending: internal event (result of Stack Logic FIG. 6) that indicates the ability of the unit to operate as a BH and AP;

init: initialize state machine;

rsi: read self information;

sdf: set DHCP Flag;

intra stack logic: execute MODULE INTRA-STACK LOGIC, FIG. 6 pndLogic: execute PENDING LOGIC, FIG. 7

EXAMPLE 1

Under this example through the Tables, a module executes software, whose functionality is described here, to automatically determine that the associated module has the role of an Access Point.

1) When power is applied hardware configuration information including the type of wireless communication supported and permitted modes is supplied automatically as a radioInfo event input while the FSM 323 is in the self-discovery (SELF_DISC) state (column 0), which causes the FSM to initialize the local states (init), read self information (rsi), and initiate the next event.

2) In reaction to a next event while in the SELF_DISC state, the FSM 323 changes state to the next state. In this case the next state is stack discovery (STACK_DISC, column 1).

3) In the STACK_DISC state (column 1) if the FSM 323 receives intraStackRprt event the FSM executes the intra-stack tests and logic (intra stack logic) described in connection with FIG. 6. MODULE INTRA-STACK LOGIC and starts the Force BH Timer. It can be seen that the intra-stack tests and logic will result in changing state to AP/B, AP, BH or PENDING based on the discovered stack topology.

4) A DHCP(e) Rprt event while in the PENDING state, signifying completion of the DHCP enquiry via wired ethernet causes the FSM to change state to AP (column 4). Under the PENDING LOGIC TABLE of FIG. 7, the module determines that a gateWay/server is found (TRUE value in second column), and thus the Result in the fourth column is "AP".

EXAMPLE 2

Under this example through the Tables, a module executes software, whose functionality is described here, to automatically determine that the associated module has the role of a Backhaul.

1) When power is applied hardware configuration information including the type of wireless communication supported is supplied automatically as a radioInfo event input while the FSM 323 is in the self-discovery (SELF_DISC) state (column 0), which causes the FSM to initialize the local states (init), read self information (rsi), and initiate the next event.

2) In reaction to a next event while in the SELF_DISC state, the FSM changes state to the next state. In this case the next state is STACK_DISC (column 1).

3) In the STACK_DISC state (column 1) if the FSM receives intraStackRprt event the FSM executes the intra-stack tests and logic (intra stack logic) described in connection with FIG. 6. MODULE INTRA-STACK LOGIC and starts the Force BH Timer. It can be seen that the intra-stack tests and logic will result in changing state to AP/B, AP, BH or PENDING based on the discovered stack topology.

4) While in the PENDING state (column 2), failure to complete a DHCP enquiry will cause "Force BH Timer" timeout which will result in the FSM changing state to the BH state (column 4).

5) A DHCP(b) Rprt event while in BH state, signifying completion of the DHCP enquiry via wireless communication causes the FSM to change state to BH_FINAL (column 5).

6) A DHCP(e) Rprt event while in the BH state, signifying completion of the DHCP enquiry via wired ethernet causes the FSM to change state to AP (column 4).

AP Selection

An AP selection process by a backhaul module determines to which access point the backhaul module will connect to with station service as defined in IEEE specification 802.11 and have a shortest round trip delay time. After powering up and performing the intra-stack discovery explained above, a node module will then go through the following steps.

(1) AP Selection, (2) Wait for DHCP request reply, and (3) Inter-stack discovery.

The following discussion describes the process.

When an access point module receives a DHCP request reply with gateway IP address, it will send ping messages to the gateway to determine the latency or round trip delay. Each module will perform learning bridge functions by well-known means and the messages between an AP and gateway may be routed in multiple wireless hops depending on the topology of an actual network. It is assumed that all AP modules that will receive a DHCP reply do not have a backhaul. Using protocol described in IEEE specification 802.11 the access point will broadcast a unique code sequence message as part of the ping messages or beacon with the round trip delay time for it to reach the gateway. The unique code may be an unused information element (e.g. id 215) in a probe response packet in order to advertise the AP round trip delay.

During this process all other nodes that have a backhaul module will start to scan the wireless neighborhood for the unique code sequence message. If a backhaul module receives only one unique message, it will connect to the AP sending the unique message. If it receives more than one unique code sequence message it will execute a comparison process to determine the access point it needs to connect to. Information needed to determine this is:

(1) AP to Gateway round trip delay (RTD) time.

(2) Received Signal Strength Indicator (RSSI) value of the access point signal strength.

Using the RSSI values of the multiple access points, the backhaul module will determine an estimated roundtrip delay for connecting through the different access points from which it received the unique code sequence message. It will then effectively add the value to the round trip delay time for that access point. From this calculation the backhaul will determine the AP it needs to connect to for the shortest roundtrip delay. This calculation process is an ongoing activity.

Specifically, to determine the RTD value (typically in microseconds), the access point converts the RSSI into an estimated link bit rate using a lookup table, such as that shown in FIG. 9. Referring to FIG. 9, the first column lists the wireless technologies, the second column shows the number of different data rates supported by each technology (Maxindex), and the remaining columns show the standard data rates in each case, in Mbits/second.

Assuming that the RSSI is within a range of 0-60 the access point uses RSSI/MaxIndex as an index to FIG. 9 to retrieve the estimated link bit rate. The access point then estimates the RTD over the proposed link using a 1500 Byte frame using the following formula:

Predicted RTD=AP_RTD+1500*8*2/(Estimated bit rate).

The preferred AP is the AP with the lowest Predicted RTD. An example of possible paths through the access point FSM 324 states in FIG. 8 follows. The entries in FIG. 8 can be understood from the following key.

init: initialize state machine;
S: selected AP;
C: candidate AP;
N: new AP;
i_C_cntr: increment candidate confidence counter;
C_cntr-: decrement candidate confidence counter;
ST: selection timer, when expired force_sel event is generated;
_stopST: stop selection timer;
PosInfo: report generated by discovery protocol containing stack name;
setStkName: set the stack name;
Rcv_rport: result of wireless scanning posted;
rcv_logic: process wireless scanning report and generate new event;
rcv_SEL_AP: selected AP has the highest score in the scanning report;
rcv_NEW_AP: a new AP has the highest score in the scanning report;
rcv_CAN_AP: candidate AP has the highest score in the scanning report;
Next internal event;
link_lost: indication of wireless link lost;
force_sel: safety selection timer—multiple APs may have the same score;
max: assigned maximum value of the variable.

EXAMPLE

AP selection FSM

1) In response to a PosInfo event while in Down state, the FSM will initialize local states, counters and record the stack name to avoid possible loops.

2) In response to a Rcv_rport event while in Down state, the FSM will execute a Next event and perform the rcv_logic which will parse the report and generate one of the following events:
rcv_SEL_AP, rcv_NEW_AP or rcv_CAN_AP. Since there is no candidate AP at this point rcv_NEW_AP event will be generated.

3) A Next event while in Down state will cause the FSM to change state to AP_DETECTED (column 1) and start the selection timer ST.

4) In response to a rcv_NEW_AP event while in AP_DETECTED state the FSM will abort any current candidate AP, adopt the new AP as a better candidate and set the candidate confidence counter (C_cntr) to 1 whatever its current state.

5) In response to a Rcv_rport event while in AP_DETECTED state the FSM will perform the rcv_logic which will generate a rcv_CAN_AP event.

6) In response to a rcv_CAN_AP event while in the AP_DETECTED state the FSM will increment the candidate confidence counter and check for completion, namely if i_C_cntr==max. If i_C_cntr==max the FSM will generate a Next event.

7) In response to a rcv_SEL_AP event while in the AP_DETECTED state, the FSM will clear the candidate confidence counter.

8) In response to a Next event while in the AP_DETECTED state, the FSM will select the candidate AP as the selected AP, S, change to the AP_SELECTED state and stop the selection timer LstopST).

Failure or removal of an AP module will result in a link_lost event which will cause the BH to follow the process described above to AP_SELECTED with a newly discovered best choice of AP.

With respect to completing the mesh by integration of network controllers (NC), of which there must be at least one and there may be more in order to provide redundancy in case of failure, each AP will measure the round trip delay (RTD) to each NC by means of the well-known ICMP (ping) protocol and collect the result or results into an NC RTD report. From the Round Trip Delay (RTD) report value for each network controller (NC) the wireless module will conclude if a network controller (NC) received is a candidate NC (NC_C), namely one that has the best (i.e. least) roundtrip delay time. If the RM receives the same NC as a candidate NC, a number x times in a row (e.g., 3) then that NC is selected as the new NC (NC_S). The number (x) is a configurable value. Each node may periodically perform at least some of the functions described in this section.

Backhaul Security

The backhaul connection uses an AES (Advanced Encryption Standard) static encryption key for all user data transmissions. (For example, the backhaul module may use the Atheros AR5001AP chipset, which includes AES keys.) Each AP (access point) maintains a common key table of enterprise keys, namely a common table consisting of a key table for the WLAN users and an additional key for the WLAN Backhaul modules. In addition, on the encryption key table an otherwise unused key is defined as a unique key. This unique key is present in the software used by all wireless modules. The purpose of this unique key is to allow temporary non-secure limited connections to be made between an existing module stack and a new stack that has been introduced to the network but not yet configured with the enterprise encryption keys.

When a new stack with a backhaul module powers up without any security keys configured, it still needs to connect to the existing system before it can be configured with the enterprise security keys. A connection with restricted capabilities is achieved by using the unique key that is present on all wireless modules. The new stack will connect with the unique key to a suitable AP and the AP will permit WLAN infrastructure management services, but it will not be able to forward any user data traffic to or from the AP. By making use of this connection with restricted capabilities, the network administrator can either allow the new stack to make a secure connection or disconnect it as an unknown stack. If the new stack is a valid new entrant to the system it will be configured by the administrator with the correct security keys and it will reset its connection to create a secure backhaul link. In the restricted mode, the AP will allow traffic from/to Strix devices only, based on a OUI (Organizationally Unique Identifier) filed in the MAC layer.

D. Conclusion

Aspects of the invention are particularly useful in providing communications with mobile wireless units or devices within a picocellular system. A picocellular system typically refers to a wireless system having wireless base stations with extremely low power designed to cover an extremely small area, such as one floor of an office building. Indeed, short range wireless communication as described herein generally refers to an effective range of 500 meters or less (and with Bluetooth, often less than 100 meters), although some systems may reach up to 1 kilometer depending upon the wireless transmission protocol and power level. Access points, nodes or base station units described herein are generally fixed relative to a given location. The location may be any stationary building or geographic space (such as a parking lot or park). Alternatively, the node may be fixed relative to a movable object such as a vehicle (e.g., train, ship or plane).

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number respectively.

The teachings of the invention provided herein can be applied to other systems, not necessarily the system described herein. For example, while much of the above Detailed Description discusses the IEEE 802.11 and Bluetooth standards, aspects of the invention may be implemented using other wireless standards, protocols or frequencies, such as CDMA, GSM, and IEEE 802.1 and 802.20. The elements and acts of the various embodiments described above can be combined to provide further embodiments.

All of the above patents and applications and other references, including any that may be listed in accompanying filing papers, as well as patent application No. PCT/US04/09237, filed Mar. 24, 2004, entitled " Self-Configuring, Self-Optimizing Wireless Local Area Network System" ; U.S. patent application Ser. No. 10/139,609, filed May 2, 2002, entitled " Wireless Base Station To Base Station Synchronization In A Communication System, Such As A System Employing a Short-range Frequency Hopping Or Time Division Duplex Scheme"; and Application No. PCT/US03/28840, filed Sep. 12, 2003, entitled "Network Access Points Using Multiple Devices" (Attorney Docket No. 34015-8008), all commonly assigned, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the node placement routine may vary considerably in its implementation details, while still be encompassed by the invention disclosed herein. As noted above, particular terminology used when describing certain features or aspects of the invention should not be taken to imply that the terminology is being re-defined herein to be restricted to any specific characteristics, features or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A system for providing wireless connectivity between multiple mobile units and an external wired network, the method comprising:
　at least first and second fixed network controller nodes, wherein each of the first and second network controller nodes are configured to exchange data with the external wired network;
　multiple, fixed wireless base stations, wherein each of the multiple wireless base stations comprises:
　　memory;
　　at least one processor coupled to the memory, and multiple software suites executed by the at least one processor, wherein the software suites include:
　　at least one software module to permit data exchange with at least one of the first and second fixed network controller nodes,
　　at least one wireless protocol software stack for permitting wireless communications exchange with at least some of the mobile units, the wireless protocol stack including one or more wireless modules positioned within said stack,
　　at least one software module for performing, by each of the wireless modules, automatic self-discovery by automatically determining a position of each of the wireless modules within the stack, by automatically identifying other wireless modules in the stack, and by automatically determining whether each of the wireless modules is a backhaul module or an access point module, and further determining for the access point a backhaul node to connect to in order to have a shortest round trip delay time; and
　　a mesh network software suite configured to periodically identify neighboring wireless base stations and network controller nodes, and further configured to periodically identify preferred communications paths to the external wired network via one of the network controller nodes or via one of the multiple wireless base stations.

2. The system of claim 1 wherein the wireless protocol software stack includes at least two software modules each for implementing a different short range wireless communications protocol.

3. The system of claim 1 wherein periodically identifying preferred communications paths includes determining a best combination of round trip delay time with, and received signal strength indication from, at least some of the network controller nodes and wireless base stations.

4. The system of claim 1 wherein periodically identifying preferred communications paths includes determining a highest data communications rate with at least some of the network controller nodes and wireless base stations.

5. The system of claim 1 wherein the mesh network software suite includes at least one self-discovery module configured to identify at least some of the functionality provided by the multiple wireless base station itself.

6. The system of claim 1 wherein the multiple software suites includes a Transmission Control Protocol/Internet Protocol (TCP/IP) suite.

7. The system of claim 1 wherein the multiple software suites includes an Ethernet connection software module.

8. The system of claim 1 wherein the multiple software suites includes a software management suite.

9. The system of claim 1 wherein the multiple software suites includes a security portion to permit encrypted data exchange with at least one of the first and second fixed network controller nodes.

* * * * *